United States Patent
Iwamura

(10) Patent No.: US 6,613,197 B1
(45) Date of Patent: Sep. 2, 2003

(54) METHOD FOR ISOLATION OF BARELY VOLATILE ORGANIC COMPOUNDS

(75) Inventor: Junichi Iwamura, 621-1, Takaida, Osaka-fu, Kashiwara (JP)

(73) Assignees: Junichi Iwamura, Osaka (JP); Laboratory of Creative Science Co., Ltd., Osaka (JP)

( * ) Notice: Subject to any disclaimer, the term of this patent is extended or adjusted under 35 U.S.C. 154(b) by 245 days.

(21) Appl. No.: 09/661,086

(22) Filed: Sep. 13, 2000

(30) Foreign Application Priority Data

Sep. 22, 1999 (JP) ............................................ 11-268546

(51) Int. Cl.[7] .............................. B01D 3/36; B01D 3/38
(52) U.S. Cl. ............................ 203/92; 203/64; 203/68; 203/95; 203/96; 203/63; 568/699; 568/913; 585/469; 585/864
(58) Field of Search ............................ 203/49, 63, 100, 203/64, 96, 68, 14, 92, 95; 568/699, 913, 916; 159/16.3, DIG. 10; 585/469, 864

(56) References Cited

U.S. PATENT DOCUMENTS

| | | | |
|---|---|---|---|
| 3,666,633 A | * 5/1972 | Essex et al. | 203/95 |
| 4,180,438 A | * 12/1979 | Brandt et al. | 203/89 |
| 4,477,354 A | * 10/1984 | Fessler | 210/634 |
| 4,588,809 A | * 5/1986 | Meyer et al. | 528/500 |
| 4,740,273 A | * 4/1988 | Martin et al. | 203/46 |
| 4,819,571 A | * 4/1989 | Hallett | 110/346 |
| 4,943,354 A | * 7/1990 | Osterburg et al. | 203/39 |
| 5,762,765 A | * 6/1998 | Berg | 203/60 |
| 5,772,851 A | * 6/1998 | Barwich et al. | 203/49 |

OTHER PUBLICATIONS

Ramos, L., et al., J. Chromatog. A, 690, 243–249 (1995).
Seidel, V., et al., Anal. Chem. 65, No. 24, 3677–3683 (1993).
Peters, T. L., Anal. Chem. 52, No. 1, 211–213 (1980).
Onuska, F. I., et al., Anal. Chem. 57, No. 4, 801–805 (4/85).
Veith, G. D., et al., Bulletin of Environmental Contamination & Toxicology, vol. 17, No. 6, 631–636 (1997).

* cited by examiner

*Primary Examiner*—Virginia Manoharan

(57) ABSTRACT

A method and apparatus for isolation of a barely volatile organic compound in a sample suspected to contain the same, e.g. a dioxin, which includes continuously adding superheated steam and a volatile and hardly water-soluble/water-insoluble solvent to a liquid or solid sample suspected to contain said organic compound to be isolated, a solid sample being dissolved in said solvent which can dissolve said organic compound to be isolated, distilling off an azeotropic mixture of said organic compound and said solvent by steam distillation, separating a solvent phase of said solvent dissolving said organic compound and said water phase, and recovering quantitatively said organic compound from said solvent. The dioxins are then further subjected to analysis, for example, GC, HRGC-MS and the like.

4 Claims, 1 Drawing Sheet

METHOD FOR ISOLATION OF BARELY VOLATILE ORGANIC COMPOUNDS

BACKGROUND OF THE INVENTION

1. Technical Field of the Invention

The present invention relates to a method for isolation of barely volatile organic compounds and an apparatus for carrying out the method. The present inventions are useful for preparation of samples for analysis containing the barely volatile organic compounds, for example, dioxins, in test samples such as ashes.

2. Description of Related Art

Recoveries of dioxins are required to be more than 60% using an official method for quantitative analysis according to law. However the official method is very troublesome and also requires highly practiced techniques and expensive devices. In comparison of steam distillation (referred to as Method I below), Soxhlet extraction (Method II) and ultrasonic extraction (Method III), F.I. Onuska et al. report that the steam distillation method (Method I) was found to be the most efficient for determination of dioxins and the order of efficiency is Method I>II>III (F.I. Onuska and K. A Terry (Anal. Chem. 1985, 57, 801–805). The official method is Method II. Ramos et al. studied and reported on 14 polychlorinated biphenyls, 10 polychlorinated dibenzo-furans and 7 polychlorinated dibenzo-dioxins recovered according to Method I (J. Chromatogr. A, 690, (1995) 243–249). The recoveries were more than 60% for some compounds, however, not for all compounds.

Polychlorinated biphenyls, polychlorinated dibenzo-furans and polychlorinated dibenzo-dioxins as typical environmental pollutants (these three kinds of compounds are all together referred to as "dioxins" by Environment Agency of Japan) and polychlorinated hydrocarbons such as Aldrin, chlordane and Dildrin as endocrine-disrupting chemicals (so-called environmental hormones) have become objects of public concern. Dioxins are also listed as endocrine-disrupting chemicals. In addition, dozens of chemicals are listed as environmental pollutants. According to co-analysis by high resolution gas chromatography and mass spectrometry (HRGC-MS), the recoveries of those compounds are required by official specification to be more than 60% using the official method. However, quantitative recoveries (i.e. almost 100%) of objective compounds (except non-volatile organic compounds) are desired.

For example, as to dioxins, 2,3,7,8-tetrachlorobenzo-p-dioxin (TCDD), 1,2,3,4,6,7,8,9-octachlorobenzo-p-dioxin (OCDD), 1,2,3,4,6,7,8,9-octachloro-dibenzofuran (OCDF), 2,3,4,7,8-pentachloro-dibenzofuran (PCDF) are mentioned as typical dioxins. Unless these dioxins can be recovered almost 100%, a method for isolation of the dioxins is not sufficient.

Ramos et al reported that PCDF was "not detected" in three recovery tests according to Method I. The toxic equivalency factor of the most toxic TCDD is 1.0 and that of PCDF is 0.5, that is, it should be noted that PCDF displays very strong toxicity and yet PCDF was "not detected".

SUMMARY OF THE INVENTION

Now it has been found, surprisingly, that in a steam distillation of a barely volatile organic compound in a test sample, where a volatile solvent and super-heated steam are simultaneously and continuously added to the organic compound in a distillation pot, whereby azeotropic distillation is constantly carried out by the ternary system of the barely volatile organic compound, the volatile solvent and super-heated steam, the boiling point of the barely volatile organic compound is decreased and the organic compound is recovered almost 100% from the test sample.

Conventional steam distillation is carried out using feeding of steam and is azeotropic distillation of a binary system of vapor of compound of interest and water vapor. F.I. Onuska et al, after all, employed azeotropic distillation of binary system (Onuska et al., ibid.) and, to stretch a point, batch-wise steam distillation. L. Ramos et al used a distiller with two distillation arms connected to two separate flasks containing an aqueous sample solution and an extraction solvent, respectively. That is, in fact, they carried out azeotropic distillation of binary system of vapor of the sample and water vapor from the aqueous sample solution, and the solvent vapor was mixed with the sample vapor on a cool condenser surface and subjected to extraction (Ramos et al., ibid.). In other words, Onuska et al and Ramos et al carry out azeotropic distillation of a binary system, not of a ternary system.

In the method of the present invention, super-heated steam simultaneously with a volatile and hardly water-soluble/water insoluble solvent is continuously injected into a distillation pot containing a barely volatile compound in order to decrease the boiling point of barely volatile compound azeotropically. The method is undoubtedly steam distillation and a volatile solvent is also injected continuously to decrease the boiling point of the barely volatile compound. The method is an azeotropic distillation relying on a ternary system. Such a method is not known in the art.

The present invention provides a method for isolation of a barely volatile organic compound from a sample suspected to contain the same, which comprises continuously adding super-heated steam and a volatile and hardly water-soluble/water-insoluble solvent to a liquid or solid sample suspected to contain said organic compound to be isolated, a solid sample being dissolved in said solvent which can dissolve said organic compound to be isolated, distilling off as an azeotropic mixture of said organic compound and said solvent by steam distillation, separating thus obtained distillate into a solvent phase of said solvent dissolving said organic compound and a water phase, and recovering quantitatively said organic compound from said solvent.

Also the invention provides an apparatus for carrying out a method for isolation of a barely volatile organic compound from a sample suspected to contain the same, which comprises continuously adding superheated steam and a volatile and hardly water-soluble/water-insoluble solvent to a liquid or solid sample suspected to contain said organic compound to be isolated, a solid sample being dissolved in said solvent which can dissolve said organic compound to be isolated, distilling off as an azeotropic mixture of said organic compound and said solvent by steam distillation, separating thus obtained distillate into a solvent phase of said solvent dissolving said organic compound and a water phase, and recovering quantitatively said organic compound from said solvent. The apparatus, for example, comprises a distillation pot, a distillation column, a steam generator, a cooling device (water-cooled or air-cooled), a separator, a thermometer, a steam control valve, and a container for a volatile and hardly water-soluble/water-insoluble solvent.

The method of the invention is useful for isolation of barely volatile organic compounds, for example, barely volatile and toxic endocrine-disrupting chemicals (so-called environmental hormones), dioxins, which are contained in ashes, industrial wastes, foods, resinoids, water of rivers, lakes or lagoons, drinking water and the like. The method according to azeotropic steam distillation of the ternary system may employed for preparation of samples for analysis by gas chromatography (electron-capture detector), high resolution gas chromatography-mass spectrometry (HRGC-MS) and the like.

According to the present invention, by carrying out of steam distillation together with continuously adding hardly water-soluble/water-insoluble solvent to a test sample containing a barely volatile organic compound, which can be easily distilled off azeotropically, the temperature in a distillation pot does not rise to the extent that the organic compound is converted to resin, and therefore, the test samples can be efficiently treated. No toxic barely volatile organic compound is detected in the distilled water accompanied by the solvent and therefore, the method of the invention is safe for environment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying a drawings which is given by way of illustration only, and thus is not limitative of the present invention and wherein

In FIG. 1, the reference characters represent the following:

Figure 1:
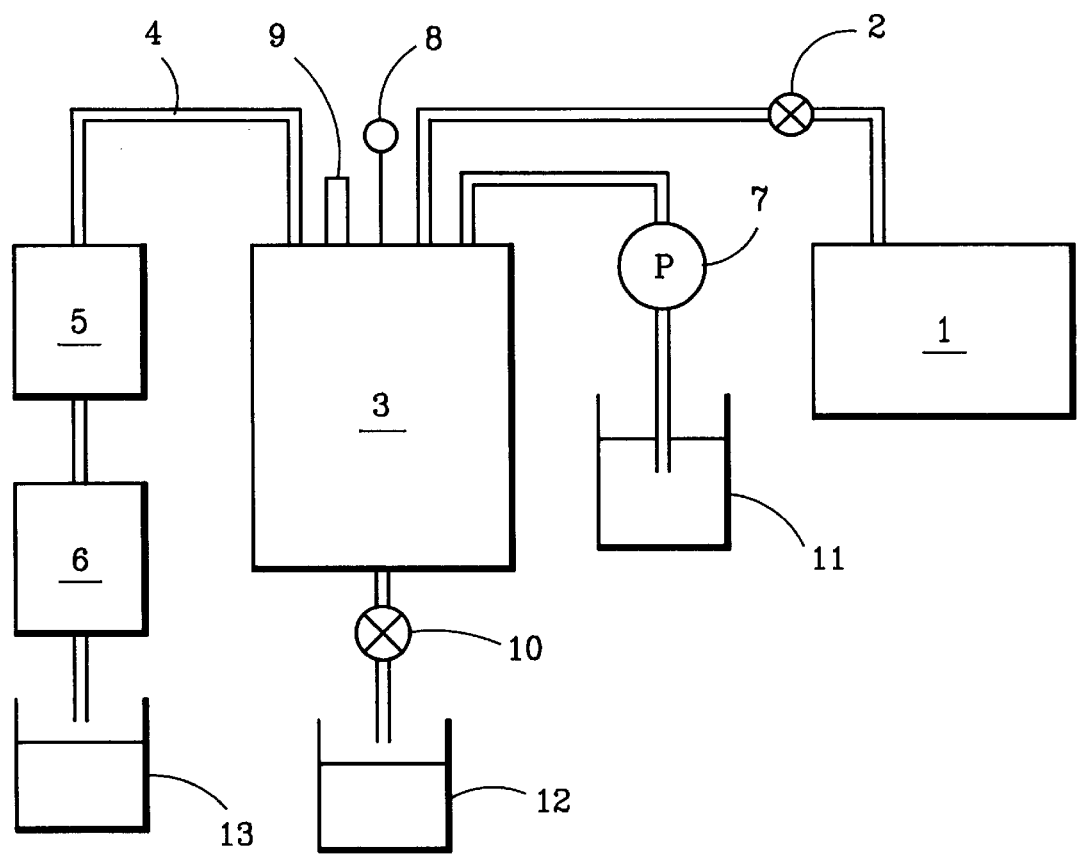
FIG. 1 is a schematic of the apparatus for fractional isolation in accordance with one embodiment of the present invention.

(1) A steam generator
(2) A valve for controlling steam
(3) A distillation pot
(4) A distillation column
(5) A water-cooled condenser
(6) A separator
(7) A pump for introducing hardly water-soluble/water-insoluble solvents
(8) A thermometer
(9) A valve in a charge inlet for a sample containing barely volatile organic compounds
(10) A valve in a discharge outlet for a residue solution
(11) A container for hardly water-soluble/water-insoluble solvents
(12) A receiver for a residue solution
(13) A receiver for a hardly water-soluble/water-insoluble solvents

DETAILED DESCRIPTION OF THE PREFERRED EMBODIMENTS

Samples used in the method and apparatus of present invention include barely volatile organic compounds, for example, polychlorinated biphenyls, polychlorinated dibenzo-furans and polychlorinated dibenzo-dioxins as typical environmental pollutants (these three kinds of compounds are all together referred to as "dioxins" by Environment Agency of Japan) and polychlorinated hydrocarbons such as Aldrin, chlordane and Dildrin as endocrine-disrupting chemicals. As barely volatile organic compounds of the invention, there are specifically mentioned 2,3,7,8-tetrachlorobenzo-p-dioxin (TCDD), 1,2,3,4,6,7,8,9-octachlorobenzo-p-dioxin (OCDD), 1,2,3,4,6,7,8,9-octachloro-dibenzofuran (OCDF), 2,3,4,7,8-pentachloro-dibenzofuran (PCDF) as typical dioxins, Aldrin, chlordane, Dildrin, Endring, PCBs indane ($\gamma$-BHC) as polychlorinated hydrocarbons, higher alkyl phthalates and samples suspected to contain them.

Typical test samples include incinerator ashes, industrial wastes, foods (including drinking water, river water, etc.), toys and the like.

The volatile and hardly water-soluble/water-insoluble solvent of the invention means a volatile solvent which scarcely dissolves in water or is almost insoluble. Suitable solvents include straight or branch alcohols having more than 5 carbon atoms, such as n-amyl alcohol, methyl amyl alcohol or 2-ethyl butanol; aliphatic esters such as n-butyl propionate or isoamyl propionate; aliphatic ethers having more than 5 carbon atoms, such as diisopropyl ether or diisoamyl ether; or hydrocarbons such as n-hexane, n-decane, toluene or xylene.

The wording "being quantitatively recovered" means that the barely volatile organic compound should be recovered 97–100%, substantially about 100%.

In general, the estimate of content of the barely volatile organic compound in a test sample is extremely low. A volatile and hardly water-soluble/water-insoluble solvent of the invention is added at a rate of 1 to 100 ml/min, preferably 5 to 50 ml/min for up to a 2 mg estimate of the compound to be isolated.

The super-heated steam is fed at an absolute pressure of 1 to 7 kg/cm$^2$, preferably 2 to 5 kg/cm$^2$, more preferably 2 to 4 kg/cm$^2$, into a distillation pot. The temperature for distilling off depends on a volatile and hardly water-soluble/water-insoluble solvent.

A barely volatile organic compound can be recovered substantially 100% by continuing the steam distillation.

In a preferred embodiment, an apparatus of the present invention includes constituent elements, for example, as follows:

(i) Means to generate super-heated steam
(ii) Means to continuously feed super-heated steam
(iii) Means to continuously add a volatile and hardly water-soluble/water-insoluble solvent
(iv) A distillation pot equipped with a distillation column
(v) A condenser to condense vapor
(vi) A separator to separate an obtained distillate into aqueous and organic phases Preferably, the apparatus of the invention can include a distillation pot, a distillation column, a steam generator, a cooling device (water-cooled or air-cooled), a separator, a thermometer, a steam control valve, and a pump for feeding a volatile and hardly water-soluble/water-insoluble solvent.

Glass and metal distillation pots are known and are commercially available. A distillation pot made to order are readily available.

Glass and metal distillation columns are known and can be commercially obtained. Distillation columns may be water-cooled or air-cooled type. They are not filled with column packing. A straight outer tube used in association with an inner tube with different diameters at regular intervals, that is a tube with different internal diameters, is preferred and contributes to the stability of the ternary system in the steam distillation of the invention. Preferred distillation columns are, for example, a straight stainless steal flexible pipe and an air-cooled condenser with a glass outer tube and a glass inner tube with five bulbs.

A steam generator is readily available. Redundant steam can be used in factories.

Various kinds of cooling devices (water-cooled or air-cooled) are commercially available.

Separators can be easily obtained in markets.

Digital or analog and various kinds of thermometers are commercially available.

Manual or automatic and various kinds of steam control valves can be obtained.

Pumps for feeding the solvent of the invention having various grades of power can be obtained.

Each constituent element above mentioned is suitably selected according to species, contents of barely volatile organic compounds and the like. For example, a thermometer can be omitted in some case.

An apparatus for fractionally isolation by steam distillation of the invention is described referring to a schematic (FIG. 1). Super-heated steam via a steam control valve (2) from a steam generator (1), simultaneously with a volatile and hardly water-soluble/water-insoluble solvent fed by a pump (7) from a container (11) for the solvent is introduced to a distillation pot (3) in which a test sample containing barely volatile organic compounds has been placed. The volatile and hardly water-soluble/water-insoluble solvent and the barely volatile organic compounds are azeotropically distilled with the super-heated steam to be condensed through a distillation column (4) and condenser (5) and led to a separator (6). The separator separates a distillate into a solvent layer above and an aqueous layer below. The solvent layer containing the barely volatile organic compounds is sent to a receiver (13) for the volatile and hardly water-soluble/water-insoluble solvent and, if necessary, the solvent layer is concentrated to be used as a sample for analysis. Aqueous solution remaining in the distillation pot is sent to a receiver (12). The thermometer (8) is used for taking an interior temperature of the distillation pot.

In comparison with conventional apparatus, the apparatus of the invention has advantages as follows:

1. Since physical processing of the apparatus is carried out at low temperature, unexpected results (i.e. leakage of hazardous chemicals) hardly arises.
2. Working costs are very low.
3. Recoveries of barely volatile organic compounds are quantitative.
4. Operations are simple.
5. Thermal efficiency is remarkably high because of using live steam.
6. No hazardous chemical is detected in distillated water.
7. Safety in operations is very high.

EXAMPLES

Example 1

Using an apparatus as shown in FIG. 1, 20.0 mg of 1,2,3,4,6,7,8,9-octachloronaphthalene (OCN) as a barely volatile organic compound is placed in a distillation pot (3) containing 1 liter of ion exchanged water passed through an activated charcoal column. It was subjected to steam distillation at a vapor pressure of 3 kg/cm$^2$ for 1 hour while simultaneously introducing toluene to the distillation pot at a rate of 5 to 10 ml/min. The period for the recovery was 8.0 hours based on an average of five experiments. The organic layer finally obtained was conventionally treated to give a sample for analysis.

Analysis shows the recovery of OCN is 97.1–101.9% with 99% of reliability in five experiments.

Example 2

The method was carried out in the same manner as described in Example 1, except that, instead of OCN, 1,2,3,4,6,7,8,9-octachlorodibenzofuran (OCDF) was employed. The period for the recovery was 20.8 hours based on an average of five experiments. Analysis shows the recovery of OCDF was 99.7–101.6% in five experiments.

Example 3

The method was carried out in the same manner as described in Example 1, except that, instead of OCN, 1,2,3,4,6,7,8,9-octachlorodibenzodioxin (OCDD) was employed. The period was 8.4 hours based on an average of five experiments. Analysis shows the recovery of OCDD was 99.4105.8% in five experiments.

Results

Thus all the dioxins tested, OCN, OCDF and OCDD were essentially quantitatively recovered.

Comparative Example 1

Using an apparatus as shown in FIG. 1 and without using a volatile and hardly water-soluble/water-insoluble solvent of the invention, 20.0 mg of 1,2,3,4,6,7,8,9-octachloronaphthalene (OCN) as a barely volatile organic compound is placed in a distillation pot (3) containing 1 liter of ion exchanged water passed through an activated charcoal column and subjected to steam distillation at a vapor pressure of 3 kg/cm$^2$ for 1 hour. OCN was not detected in a distillate.

Comparative Example 2

The method was carried out in the same manner as in Comparative Example 1 except that, instead of OCN, 2.0 mg of 1,2,3,4,6,7,8,9-octachlorobenzofuran (OCDF) was subjected to steam distillation for 1.2 hour. OCDF was not detected in a distillate.

Comparative Example 3

The method was carried out in the same manner as described in Comparative Example 1 except that, instead of OCN, 1,2,3,4,6,7,8,9-octachlorobenzo-dioxin (OCDD) was subjected to steam distillation, and OCDD was recovered 12.3% in a distillate.

Comparative Example 4

Using an apparatus as shown in FIG. 1, 20.0 mg of 1,2,3,4,6,7,8,9-octachloronaphthalene (OCN) as a barely volatile organic compound was introduced through a charge inlet to a distillation pot which contains 1 liter of ion exchanged water passed through an activated charcoal column and 200 ml of isopropyl ether as a volatile and hardly water-soluble/water-insoluble solvent was added thereto and subjected to steam distillation at a vapor pressure of 3 kg/cm$^2$ for 1 hour in batch operation. A recovery of OCN was 7.40%.

Comparative Example 5

The method was carried out in the same manner as described in Comparative Example 4 except that, instead of 200 ml of isopropyl ether, 200 ml of toluene was used as a volatile and hardly water-soluble/water-insoluble solvent. A recovery of OCN was 16.82%.

Results

Thus, the dioxins in the Comparative Examples were not recovered quantitatively.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

What is claimed is:

1. A method for isolation of a dioxin from a sample containing the dioxin, which comprises continuously adding superheated steam and a volatile and hardly water-soluble or water-insoluble solvent which can dissolve said dioxin, to a sample containing said dioxin, said sample being liquid or a solid dissolved in said solvent, distilling off as an azeotropic ternary mixture of said dioxin, water, and said solvent, at the boiling point of said mixture under atmospheric pressure, by steam distillation, separating thus obtained distillate into a solvent phase of said solvent dissolving said dioxin and a water phase, and recovering quantitatively said dioxin from said solvent.

2. A method for isolation of a barely volatile organic compound which is an endocrine-disrupting chemical from a sample containing the barely volatile organic compound, which comprises continuously adding superheated steam and a volatile and hardly water-soluble or water insoluble solvent which can dissolve said barely volatile organic compound, to a sample containing said barely volatile organic compound, said sample being liquid or a solid dissolved in said solvent, distilling off as an azeotropic ternary mixture of said barely volatile organic compound, water, and said solvent, at the boiling point of said mixture under atmospheric pressure, by steam distillation, separating thus obtained distillate into a solvent phase of said solvent dissolving said barely volatile organic compound and a water phase, and recovering quantitatively said barely volatile organic compound from said solvent.

3. The method according to claim 1 or 2, wherein said volatile and hardly water-soluble or water-insoluble solvent is selected from a group consisting of aliphatic ethers having more than 5 carbon atoms, aliphatic alcohols having more than 5 carbon atoms, hydrocarbons and mixtures thereof.

4. The method according to claim 3 wherein the vapor pressure of said superheated steam is an absolute pressure of 1–7 $kg/cm^2$.

* * * * *